US008068690B2

(12) United States Patent
Itoh

(10) Patent No.: US 8,068,690 B2
(45) Date of Patent: Nov. 29, 2011

(54) IMAGE PROCESSING APPARATUS, IMAGE PROCESSING METHOD, COMPUTER-READABLE MEDIUM AND COMPUTER DATA SIGNAL

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 685 days.

(21) Appl. No.: 12/194,098

(22) Filed: Aug. 19, 2008

(65) Prior Publication Data
US 2009/0052799 A1  Feb. 26, 2009

(30) Foreign Application Priority Data

Aug. 24, 2007  (JP) ................................. 2007-218354

(51) Int. Cl.
*G06K 9/40* (2006.01)
(52) U.S. Cl. ........ 382/266; 382/162; 382/167; 382/274; 382/267; 382/268; 358/1.9; 358/3.23
(58) Field of Classification Search .................. 382/162, 382/164, 165, 166, 167, 168, 169, 266, 267, 382/268, 274; 348/453, 673, 678; 358/1.9, 358/3.23, 518; 345/589, 590, 604, 605, 690, 345/204, 594
See application file for complete search history.

(56) References Cited

U.S. PATENT DOCUMENTS

| 7,595,826 | B2 * | 9/2009 | Aoki et al. ..................... 348/273 |
| 2003/0058475 | A1 | 3/2003 | Hofman |
| 2004/0218075 | A1 * | 11/2004 | Tsuruoka ...................... 348/272 |
| 2007/0064118 | A1 * | 3/2007 | Mishina ...................... 348/222.1 |
| 2007/0098288 | A1 * | 5/2007 | Raskar et al. ................. 382/254 |
| 2008/0187234 | A1 * | 8/2008 | Watanabe et al. ............. 382/254 |

FOREIGN PATENT DOCUMENTS

| JP | A-06-078151 | 3/1994 |
| JP | A-2002-083294 | 3/2002 |
| JP | A-2002-252773 | 9/2002 |
| JP | A-2003-179762 | 6/2003 |
| JP | A-2004-102819 | 4/2004 |
| JP | A-2007-013566 | 1/2007 |

OTHER PUBLICATIONS

Office Action issued in corresponding Japanese Application No. 2007-218354 dated Feb. 23, 2011 (with translation).

\* cited by examiner

*Primary Examiner* — Samir Ahmed
*Assistant Examiner* — Ali Bayat
(74) *Attorney, Agent, or Firm* — Oliff & Berridge, PLC

(57) ABSTRACT

An image processing apparatus includes a first enhancement degree calculation unit and a color contour enhancement unit. The first enhancement degree calculation unit calculates a contour intensity of a color component of an input color image and calculates an enhancement degree for a color contour, based on the contour intensity of the color component. The color contour enhancement unit performs an enhance process for a lightness component of the color image in accordance with the enhancement degree for the color contour calculated by the first enhancement degree calculation unit.

3 Claims, 12 Drawing Sheets

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2007-218354 filed Aug. 24, 2007.

BACKGROUND

1. Technical Field

The invention relates to an image processing apparatus, an image processing method, a computer-readable medium and a computer data signal.

2. Related Art

It has been a common practice to convert a color image into a grayscale image. One technology of the related art for converting a color image into a grayscale image simply extracts lightness components from the color image. If colors having similar lightness levels are used in many portions of the color image, these colors are converted into similar grayscale levels.

SUMMARY

According to an aspect of the invention, an image processing apparatus includes a first enhancement degree calculation unit and a color contour enhancement unit. The first enhancement degree calculation unit calculates a contour intensity of a color component of an input color image and calculates an enhancement degree for a color contour, based on the contour intensity of the color component. The color contour enhancement unit performs an enhance process for a lightness component of the color image in accordance with the enhancement degree for the color contour calculated by the first enhancement degree calculation unit.

BRIEF DESCRIPTION OF THE DRAWINGS

Exemplary embodiments of the invention will be described in detail based on the following figures, wherein.

DETAILED DESCRIPTION

Figure 1:
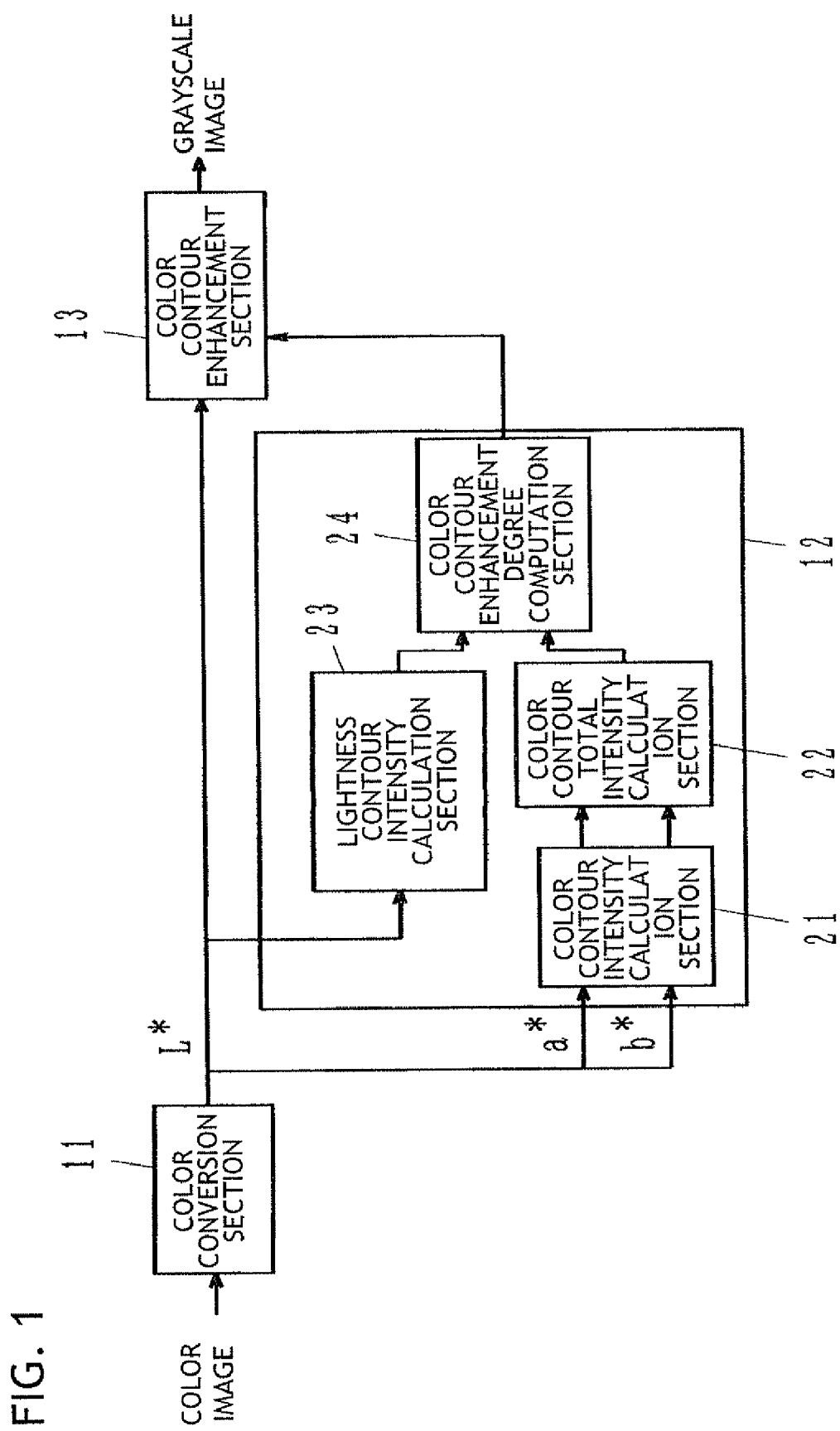
FIG. 1 is a block diagram showing a first exemplary embodiment of the invention.

FIG. 1 is a block diagram showing a first exemplary embodiment of the invention. In FIG. 1, reference numeral 11 denotes a color conversion section. Reference numeral 12 denotes a color contour enhancement degree calculation section. Reference numeral 13 denotes a color contour enhancement section. Reference numeral 21 denotes a color contour intensity calculation section. Reference numeral 22 denotes a color contour total intensity calculation section. Reference numeral 23 denotes a lightness contour intensity calculation section. Reference numeral 24 denotes a color contour enhancement degree computation section. The color conversion section 11 converts an input color image into an image in a color space in which a lightness (luminance) component and a color component can be handled separately. For example, in the following description, an input color image is converted into an image in an $L^*a^*b^*$ color space. When an input image belongs to a color space in which a lightness component and a color component can be handled, there is no need to convert the input image, and the color conversion section 11 may be omitted.

The color contour enhancement degree calculation section 12 calculates a contour intensity of color components of the input color image and calculates an enhancement degree for a color contour, which will be used in an enhancement process performed by the color contour enhancement section 13. In the example shown in FIG. 1, the enhancement degree for the color contour is calculated using a lightness component of the input color image together. In this example, the color contour enhancement degree calculation section 12 includes the color contour intensity calculation section 21, the color contour total intensity calculation section 22, the lightness contour intensity calculation section 23, and the color contour enhancement degree computation section 24.

If adjacent pixels are different in each color component from each other, the color contour intensity calculation section 21 calculates a contour intensity of each color component in the color image. The contour intensity indicates a degree of the difference. In this example, the contour intensity is calculated for each of the components $a^*$ and $b^*$. Any method for calculating the contour intensity may be used.

The color contour total intensity calculation section 22 calculates a total intensity of the color contour based on the contour intensities for the color components calculated by the color contour intensity calculation section 21. For example, when the color contour intensity calculation section 21 calculates the contour intensities for the components $a^*$ and $b^*$, the color contour total intensity calculation section 22 may calculate a square root of a sum of squares of the two contour intensities. The color contour total intensity calculation section 22 may, of course, adopt anther method.

The lightness contour intensity calculation section 23 calculates a contour intensity for the lightness component in the color image. Any method for calculating the contour intensity may be used. If the color contour enhancement degree computation section 24 does not use the contour intensity of the lightness component, the lightness contour intensity calculation section 23 may be omitted.

The color contour enhancement degree computation section 24 obtains an enhancement degree, which will be used in the enhancement process for color contour, using the total color contour intensity calculated by the color contour total intensity calculation section 22 and, if necessary, further using the contour intensity of the lightness component calculated by the lightness contour intensity calculation section 23.

The color contour enhancement section 13 performs the enhancement process for the lightness component of the color image in accordance with the enhancement degree for the color contour calculated by the color contour enhancement degree calculation section 12. In this way, the enhancement process is performed for a portion in the lightness component of the color image where a color contour is present. For example, if pixels being similar in lightness level but different in color, the lightness component alone does not tell such a situation. However, by performing the enhancement process for the portion where the color contour is present, the grayscale levels in a position where different colors are adjacent to each other are changed to show that there is a change in color. Any enhancement process may be used. Examples of the enhancement process may include performing the convolution operation for a pixel of interest and the surrounding pixels using an enhancement filter and making a correction by adding or subtracting a grayscale level in accordance with the enhancement degree.

Figure 2:
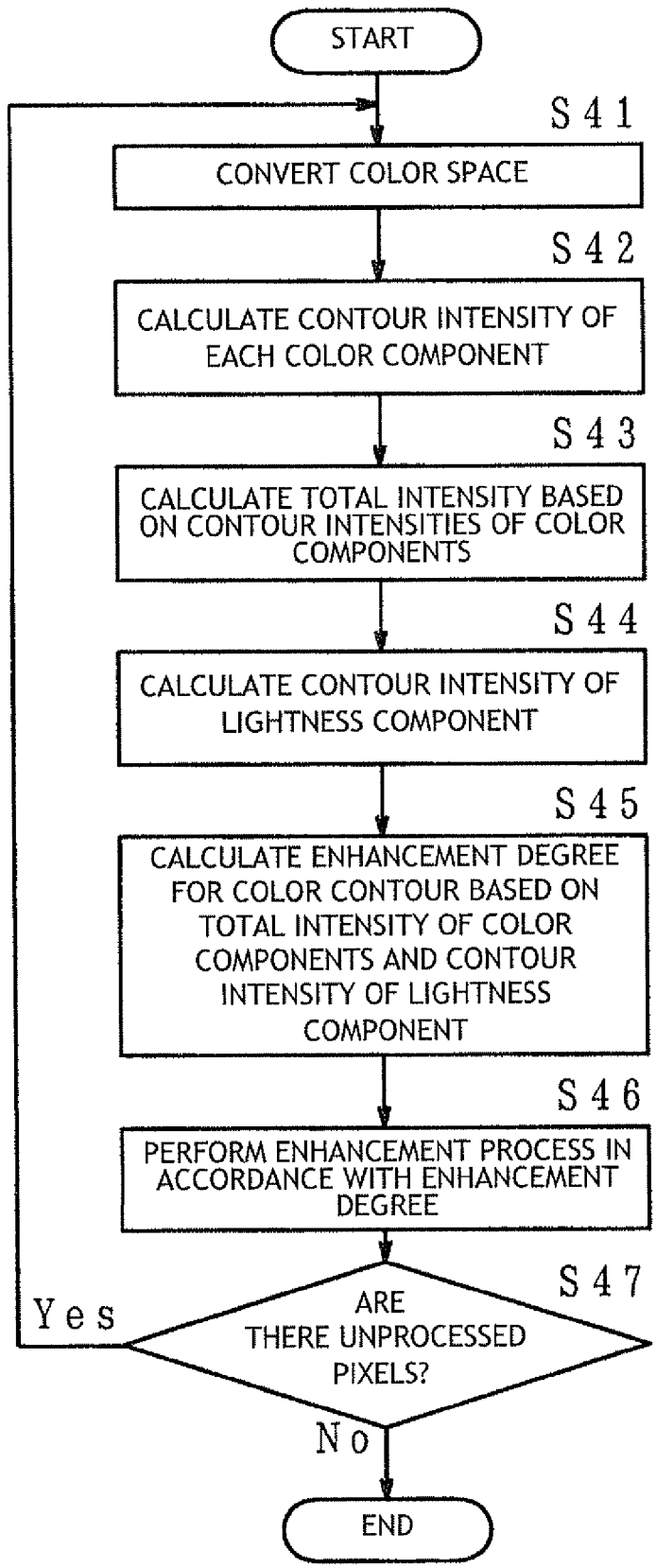
FIG. 2 is a flowchart showing an example of the operation of the first exemplary embodiment of the invention.
Figure 3:
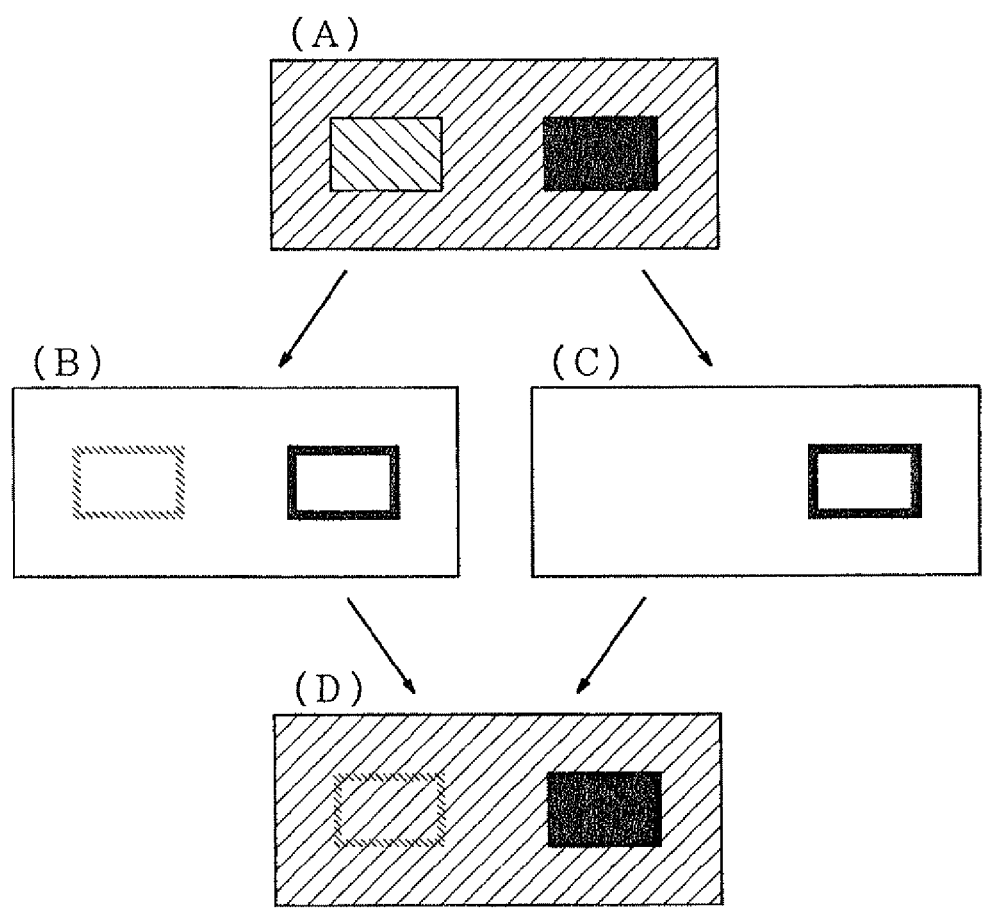
FIG. 3 is an explanatory view of a specific example of the operation of the first exemplary embodiment of the invention.

FIG. 2 is a flowchart showing an example of the operation of the first exemplary embodiment of the invention, and FIG. 3 is an explanatory view of a specific example of the same. The example of the operation shown in FIG. 2 will be described with reference to the specific example shown in FIG. 3. FIG. 3(A) shows an example of an input color image. For convenience of illustration, intervals between oblique lines represent grayscale levels, and directions of the oblique lines represent a difference in color. In this example, the left rectangle in FIG. 3(A) is a portion where its lightness is similar to that of the surroundings but its color is different from that of the surroundings. The right rectangle in FIG. 3(A) is an area painted with black.

When a color image is input, the processes in FIG. 2 are performed while pixels in the color image are set in sequence to a pixel to be processed. In S41, the color conversion section 11 converts the pixel to be processed into an image in a color space having a lightness component and a color component, if necessary. If the input color image belongs to a color space having a lightness component and a color component, the above color conversion is, of course, not necessary.

In S42, the color contour intensity calculation section 21 of the color contour enhancement degree calculation section 12 calculates a contour intensity of each color component of the pixel to be processed. For example, if the L*a*b* color space is used as the color space, the contour intensity is calculated for each of the components a* and b*, Furthermore, in S43, the color contour total intensity calculation section 22 calculates the total color contour intensity based on the contour intensities of the color components. FIG. 3(B) shows color contours for which contour intensities are calculated. Since the left rectangle in FIG. 3(B) has a color different from that of the surroundings, the contour intensity is calculated for its contour. Also, in the right rectangle painted with black in FIG. 3(B), the rectangle is considered to have a different color from its surroundings and therefore, the contour intensity is calculated for its contour.

In S44, the lightness contour intensity calculation section 23 of the color contour enhancement degree calculation section 12 calculates a contour intensity of the lightness component of the color image. FIG. 3(C) shows a lightness contour for which its contour intensity is calculated. Since the left rectangle in FIG. 3(C) is different in color from its surroundings but is similar in lightness level to its surrounding, no contour is detected. In the right rectangle in FIG. 3(C), the contour intensity is calculated for its contour. The process in S44 and the processes in S42 and S43 may be carried out sequentially in this order, or the processes in S42 and S43 may be first carried out and the process in S44 may be then carried out. Alternatively, the process in S44 and the processes in S42 and S43 may be carried out concurrently.

Figure 4:
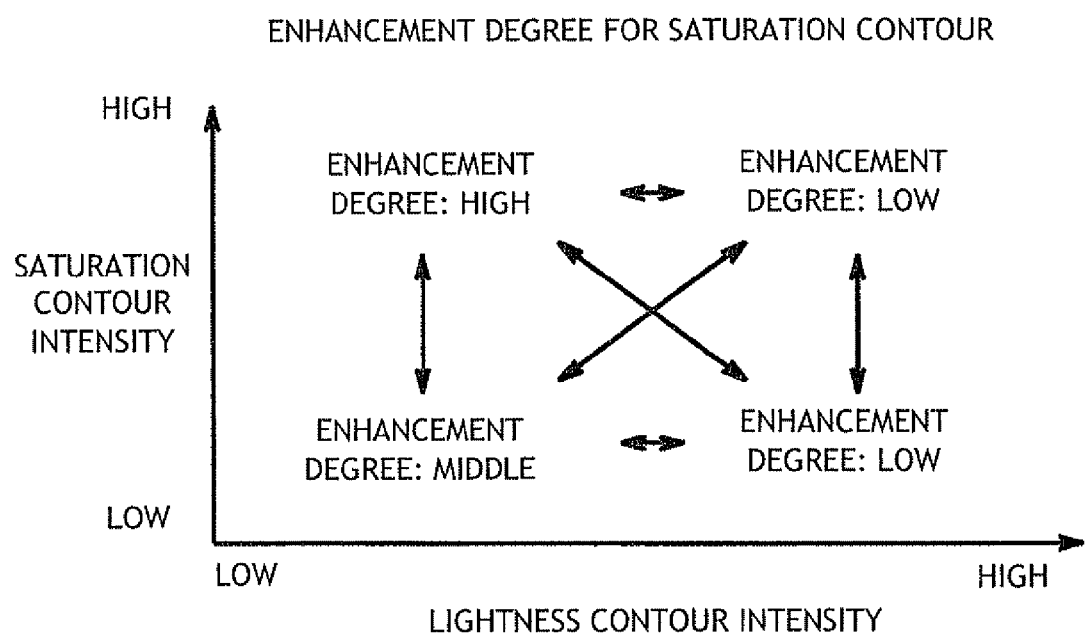
FIG. 4 is an explanatory view of an example of the operation of a color contour enhancement degree computation section 24 according to the first exemplary embodiment of the invention.

After the total color contour intensity and the contour intensity of the lightness contour are calculated, the color contour enhancement degree computation section 24 obtains in S45 an enhancement degree, which will be used in the enhancement process for the color contour. FIG. 4 is an explanatory view of an example of the operation of the color contour enhancement degree computation section 24 according to the first exemplary embodiment of the invention. The color contour enhancement degree computation section 24 an enhancement degree based on the total color contour intensity and the contour intensity of the lightness contour so that the enhancement degree shows, for example, a tendency shown in FIG. 4.

For example, if the contour intensity of the lightness contour is high, a strong contour appears in the lightness component of the color image. Hence, the difference in color is expressed by this contour. Therefore, the enhancement process for the color contour may not be performed at all in such a portion or may be performed in a moderate manner even if performed. In such a case, the enhancement degree is therefore lowered.

If the contour intensity of a lightness contour is low, colors being less different in lightness but being different in color may be used. The enhancement degree is therefore calculated in accordance with the total color contour intensity. That is, if the total color contour intensity is high, the enhancement degree is increased, while if the total color contour intensity is low, the enhancement degree is set to an intermediate value or is lowered. If the enhancement degree is set to the intermediate value, a contour appears in a portion where the difference in lightness is small and the difference in color is small.

The enhancement degree being calculated to show such a tendency is passed to the color contour enhancement section 13, and the enhancement process is performed for the lightness component of the color image in S46. In S47, it is judged as to whether or not unprocessed pixels remain. If there are unprocessed pixels, the flow returns to S41 and the processes described above are repeatedly carried out for the unprocessed pixels. If there is no unprocessed pixel, the flow is terminated.

FIG. 3(D) shows an image obtained by carrying out the above processes. The lightness contour is reflected in the lightness component, but the color contour is not reflected in the image if the difference in lightness is small. A color contour having a small difference in lightness is enhanced to increase the difference in lightness between the contour and the surroundings thereof by performing the enhancement process using the enhancement degree showing the tendency of FIG. 4. In this way, a color contour having a small difference in lightness appears. As shown in FIG. 3(C), no lightness contour appears for the left rectangle of FIG. 3(A), but the enhancement process causes a contour of the left rectangle to appear as shown in FIG. 3(D). A grayscale image recognized to have two rectangles as a whole is thus obtained.

Figure 5:
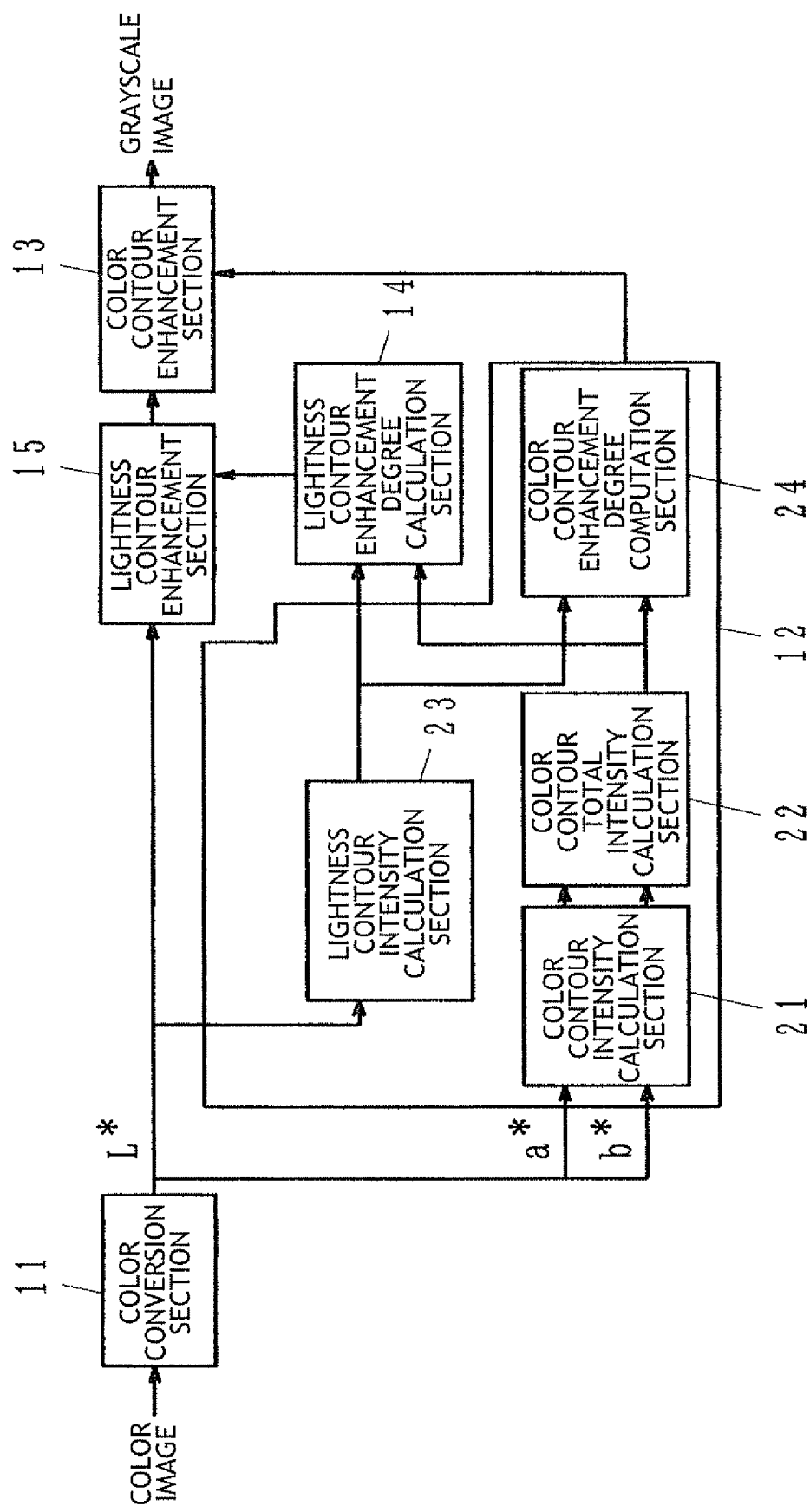
FIG. 5 is a block diagram showing a modified example of the first exemplary embodiment of the invention.

FIG. 5 is a block diagram showing a modified example of the first exemplary embodiment of the invention. In FIG. 5, reference numeral 14 denotes a lightness contour enhancement degree calculation section, and reference numeral 15 denotes a lightness contour enhancement section. The modified example of the first exemplary embodiment shows an example in which the contour enhancement process is also performed for the lightness component of the color image.

Figure 6:
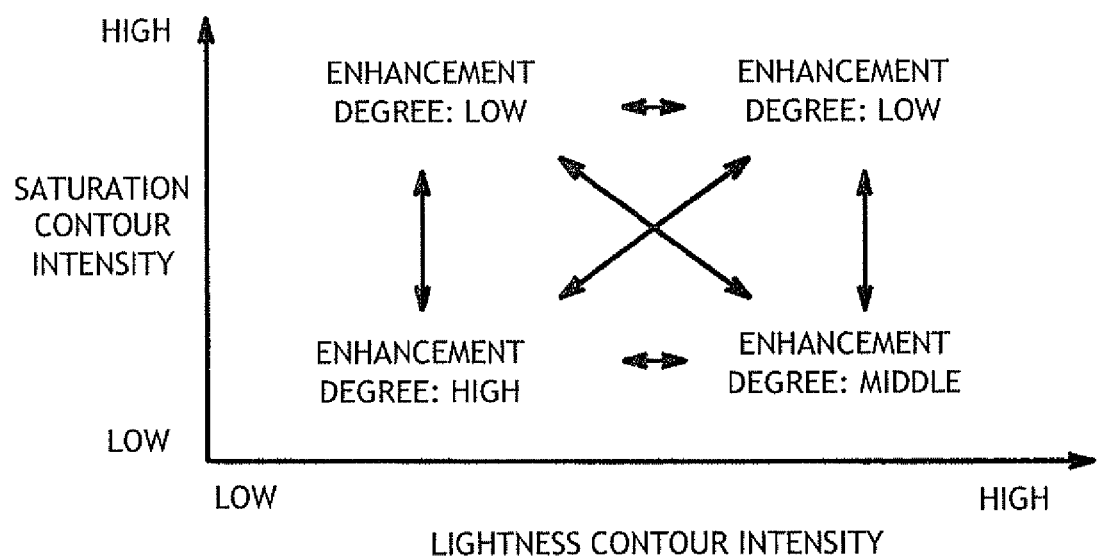
FIG. 6 is an explanatory view of an example of the operation of a lightness contour enhancement degree calculation section 14 according to the modified example of the first exemplary embodiment of the invention.

The lightness contour enhancement degree calculation section 14 calculates a enhancement degree for a lightness contour, which will be used in an enhancement process performed by the lightness contour enhancement section 15, based on the lightness contour intensity and the total color contour intensity which are calculated in the process of calculating the enhancement degree for the color contour in the color contour enhancement degree calculation section 12. FIG. 6 is an explanatory view of an example of the operation of the lightness contour enhancement degree calculation section 14 according to the modified example of the first exemplary embodiment of the invention. For example, if the contour intensity of the color contour is high, the enhancement degree is lowered by the lightness contour enhancement degree calculation section 14 because the color contour enhancement section 13 performs the enhancement process. On the other hand, if the contour intensity of the color contour is low and if the lightness contour intensity is low, the enhancement degree is increased. If the contour intensity of the color contour is low and if the lightness contour intensity is high, the enhancement degree is lowered. By increasing the enhancement degree when the lightness contour intensity is low, faded characters and faded line drawings, for example, due to a low writing pressure are enhanced and clarified.

The lightness contour enhancement section 15 performs the enhancement process for the lightness component of the color image in accordance with the enhancement degree for the lightness contour, which is calculated by the lightness contour enhancement degree calculation section 14. Any enhancement method may be used. Examples of the enhancement process may include performing a convolution operation using the pixel of interest and the surrounding pixels and using a middle and high frequency enhancement filter.

In the example shown in FIG. 5, the lightness contour enhancement section 15 first performs the enhancement process for the lightness component of the color image in accordance with the enhancement degree for the lightness contour calculated by the lightness contour enhancement degree calculation section 14 and then, the color contour enhancement section 13 performs the enhancement process for the color contour. However, the color contour enhancement section 13 may first performs the enhancement process for the color contour and then, the lightness contour enhancement section 15 may perform the enhancement process for the lightness contour.

Figure 7:
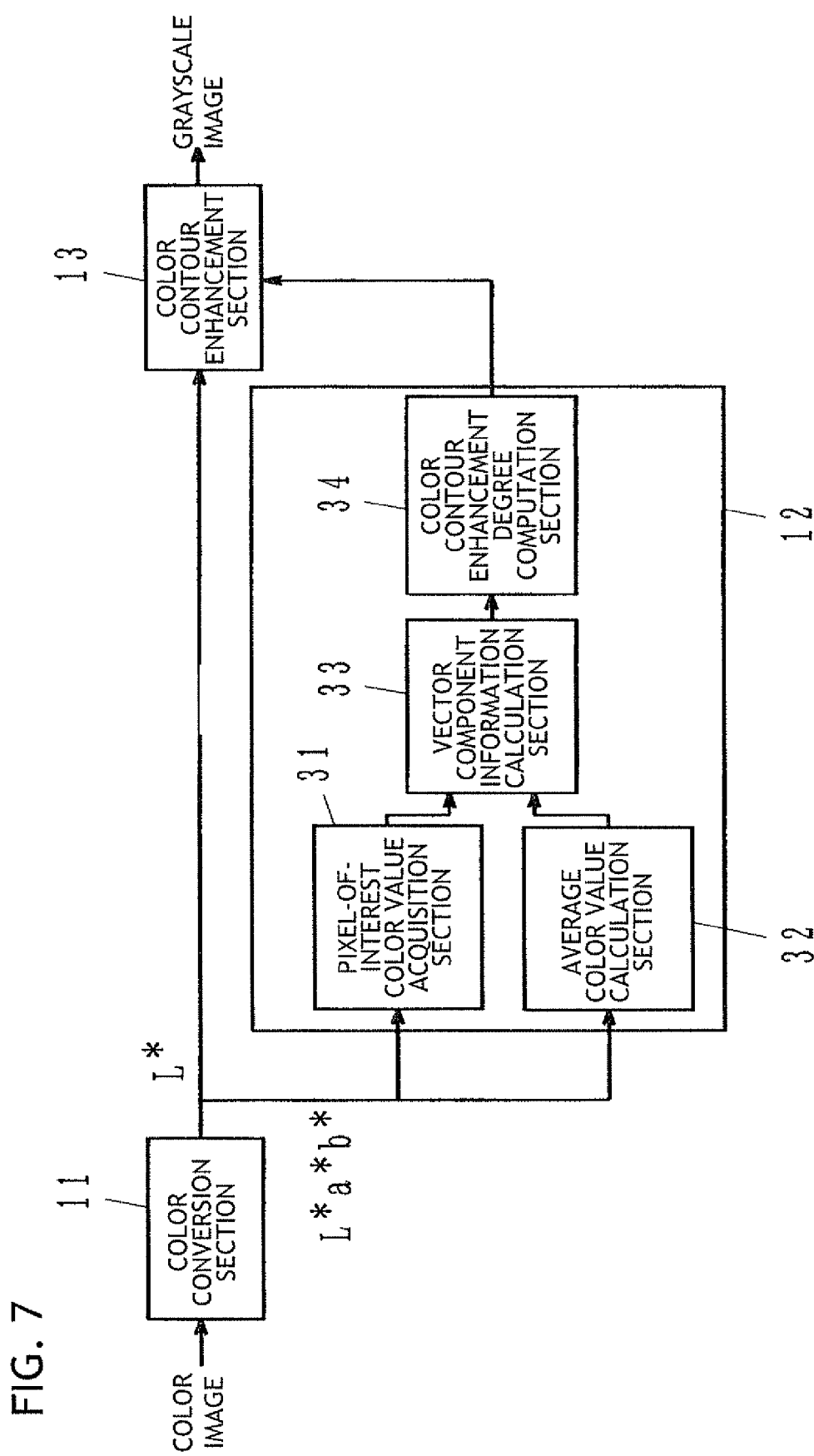
FIG. 7 is a block diagram showing a second exemplary embodiment of the invention.

FIG. 7 is a block diagram showing a second exemplary embodiment of the invention. In FIG. 7, reference numeral 31 denotes a pixel-of-interest color value acquisition section. Reference numeral 32 denotes an average color value calculation section. Reference numeral 33 denotes a vector component information calculation section. Reference numeral 34 denotes a color contour enhancement degree computation section. The second exemplary embodiment is different from the first exemplary embodiment in the configuration of the color contour enhancement degree calculation section 12. No redundant description of the color conversion section 11 and the color contour enhancement section 13 will be made.

The color contour enhancement degree calculation section 12 sets respective pixels of an input color image to a pixel of interest in sequence and calculates the enhancement degree for the color contour in the pixel of interest, based on a difference vector between a color value of the pixel of interest and an averaged color value of the surrounding area around the pixel of interest. The calculated enhancement degree for the color contour will be used in the enhancement process performed by the color contour enhancement section 13. To this end, the color contour enhancement degree calculation section 12 includes the pixel-of-interest color value acquisition section 31, the average color value calculation section 32, the vector component information calculation section 33, and the color contour enhancement degree computation section 34.

The pixel-of-interest color value acquisition section 31 acquires a color value of the pixel of interest, which is selected from the input color image in sequence.

The average color value calculation section 32 calculates an average of color values of the pixels in the surrounding area around the pixel of interest and sets the resultant value as an average color value. The size and shape of the surrounding area may be arbitrarily set in advance.

Figure 8:
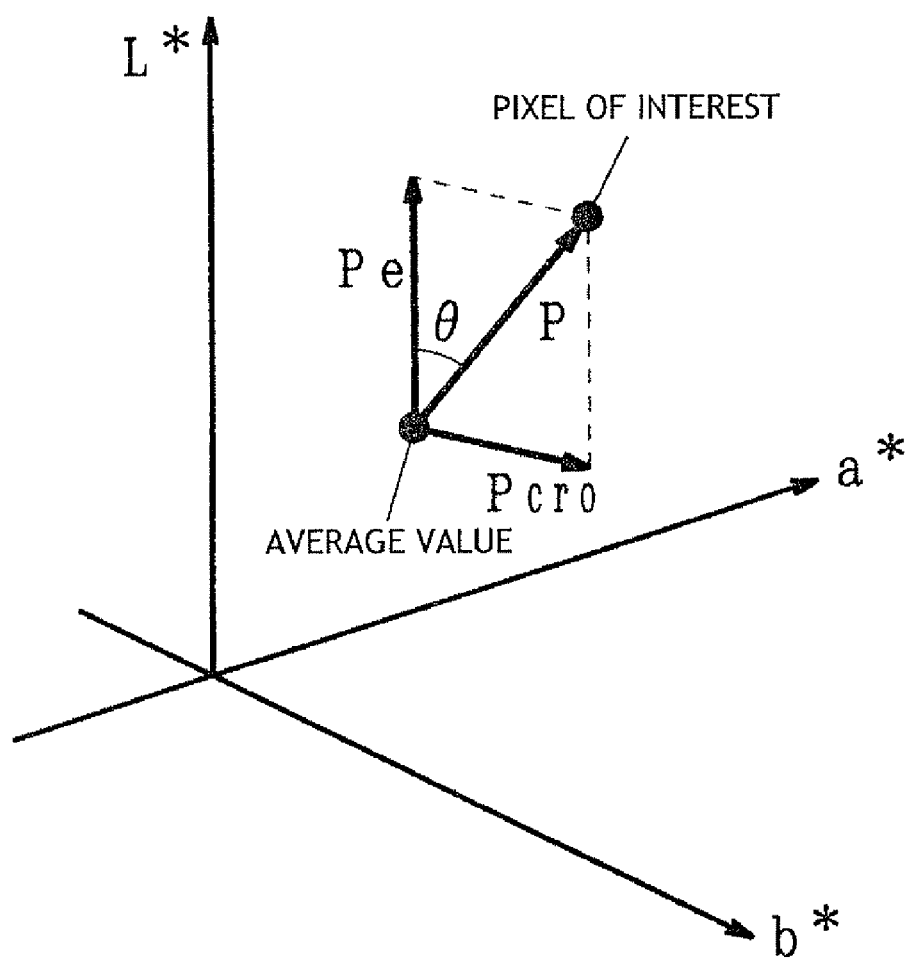
FIG. 8 is an explanatory view of an example of vector component information calculated by a vector component information calculation section 33 according to the second exemplary embodiment of the invention.

The vector component information calculation section 33 obtains a difference vector in the color space pointing from the average color value calculated by the average color value calculation section 32 to the color value of the pixel of interest acquired by the pixel-of-interest color value acquisition section 31, and calculates vector component information of the difference vector. FIG. 8 is an explanatory view of an example of the vector component information calculated by the vector component information calculation section 32 according to the second exemplary embodiment of the invention. In this example, the vector component information to be obtained includes a lightness component of the difference vector, a color component of the difference vector and an angle of deviation between the difference vector and the lightness axis. In the example shown in FIG. 8, the difference vector is shown as P, and the lightness component and the color component thereof are shown as Pe and Pero, respectively. The angle of deviation is an angle θ between the lightness component Pe and the difference vector P. The vector component information is calculated and passed to the color contour enhancement degree computation section 34.

Figure 9A:
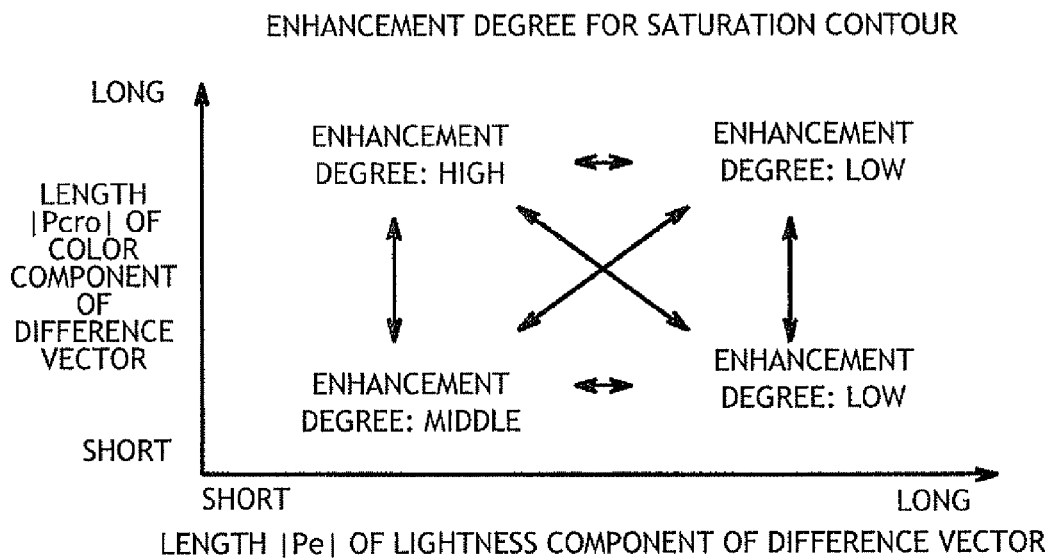
FIGS. 9A and 9B are explanatory views of examples of the operation of a color contour enhancement degree computation section 34 according to the second exemplary embodiment of the invention.

The color contour enhancement degree computation section 34 determines the enhancement degree, which will be used in the enhancement process for the color contour, according to the vector component information passed from the vector component information calculation section 33. FIG. 9 is an explanatory view of an example of the operation of the color contour enhancement degree computation section 34 according to the second exemplary embodiment of the invention. FIG. 9A shows the tendency of the enhancement degree which is determined in accordance with the length of the lightness component Pe and the length of the color component Pero of the difference vector. A long lightness component Pe indicates that the lightness of the pixel of interest greatly differs from those of the surrounding pixels. In this case, since the enhancement process does not need to be strong, the enhancement degree is lowered. Also, a short lightness component Pe indicates that the lightness of the pixel of interest is not greatly different from those of the surrounding pixels. In this case, the enhancement degree is determined in accordance with the length of the color component Pero. That is, if the length of the color component Pero is long, the enhancement degree is increased to show a color contour more clearly. If the length of the color component Pero is short, the enhancement degree is set to an intermediate value to show the presence of a weak color contour.

Figure 9B:
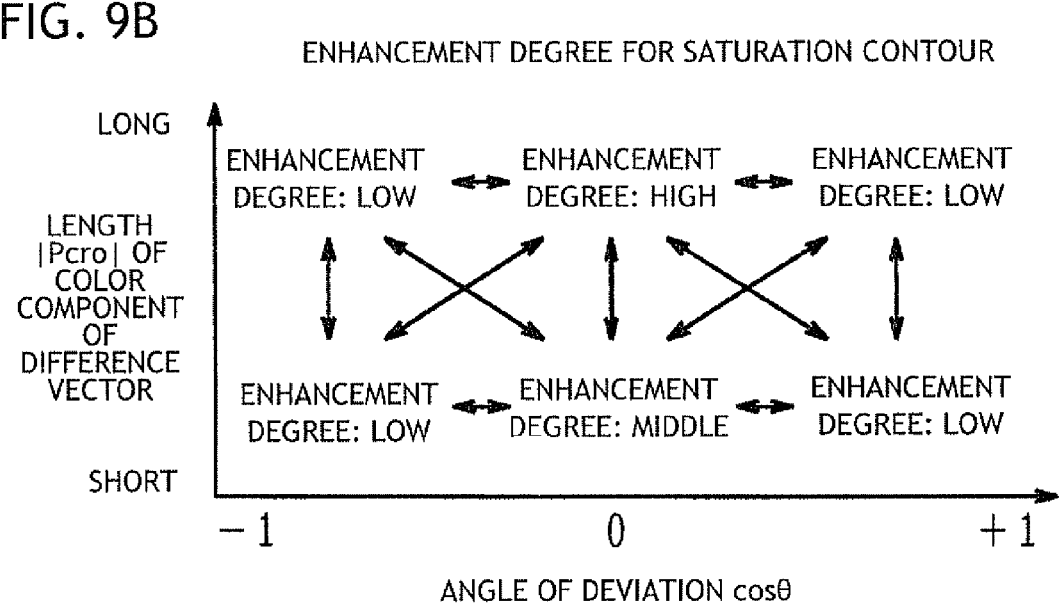

FIG. 9B shows the tendency of the enhancement degree which is determined in accordance with the angle of deviation $\theta$ (cos $\theta$ in this case) and the length of the color component Pero. If the angle of deviation $\theta$ is close to 0 degree or 180 degrees, that is, if the value of cos $\theta$ is close to ±1, it is indicated that the difference vector is oriented in a direction along the lightness axis. Therefore, in this case, since the intensity of the color contour is small and the intensity of the lightness contour is large, the degree of saturation contour enhancement is lowered. If the angle of deviation $\theta$ is close to 90 degrees, that is, if the value of cos $\theta$ is close to 0, it is indicated that the difference vector is oriented in the direction of the color component. In this case, the enhancement degree is determined in accordance with the length of the color component Pero. That is, if the length of the color component Pero is long, the enhancement degree is increased to show a color contour more clearly. If the length of the color component Pero is short, the enhancement degree is set to an intermediate value to show the presence of a weak color contour.

The enhancement degree may be calculated by using either the tendency of the enhancement degree, which is determined in accordance with the length of the lightness component Pe and the length of the color component Pero of the difference vector, as shown in FIG. 9A or the tendency of the enhancement degree, which is determined in accordance with the angle of deviation $\theta$ and the length of the color component Pero, as shown in FIG. 9B, or may be calculated by using the two tendencies. The enhancement degree is, of course, not necessarily calculated in accordance with the example described above, but may be calculated by using another method.

The color contour enhancement section 13 performs the enhancement process for the lightness components of the color image in accordance with the enhancement degree, which is calculated by the color contour enhancement degree computation section 34 based on any of the tendencies described above. In this way, when a color contour is present in a portion where a strong lightness contour does not appear for the lightness components of the color image, the enhancement process is performed for the color contour, thereby expressing the presence of the difference in color that is not shown by the lightness components of the color image alone.

Figure 10:
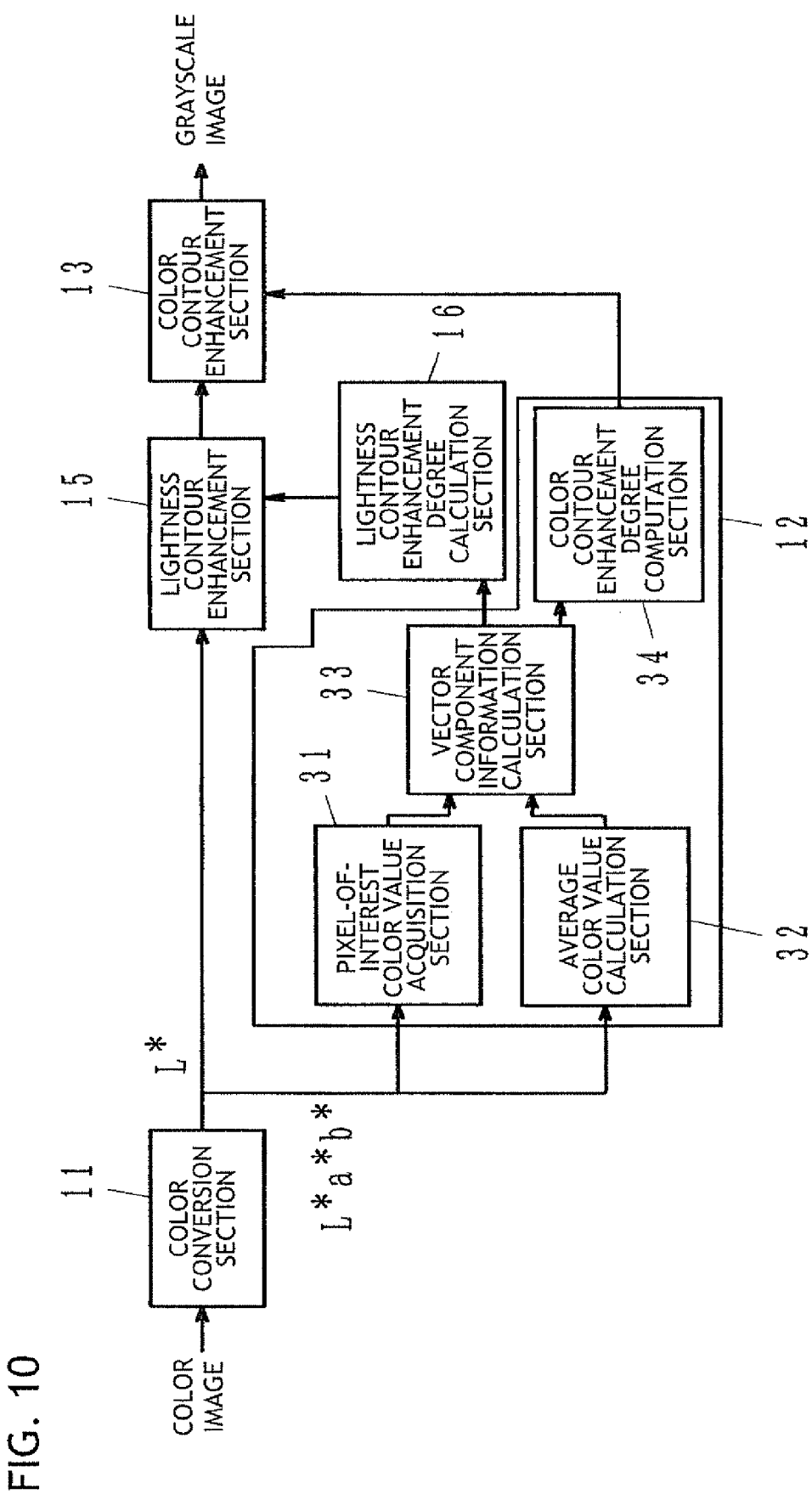
FIG. 10 is a block diagram showing a modified example of the second exemplary embodiment of the invention.

FIG. 10 is a block diagram showing a modified example of the second exemplary embodiment of the invention. In FIG. 10, reference numeral 16 denotes a lightness contour enhancement degree calculation section. The modified example of the second exemplary embodiment shows an example in which the lightness contour enhancement degree calculation section 16 and the lightness contour enhancement section 15 are added to the configuration shown in FIG. 7, and the contour enhancement process is also performed for the lightness component of a color image.

Figure 11:
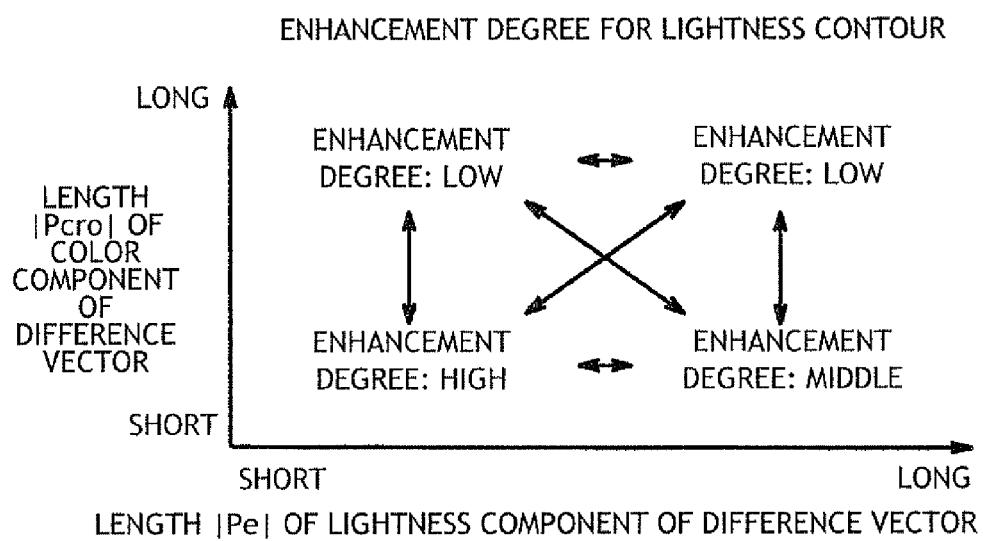
FIG. 11 is an explanatory view of an example of the operation of a lightness contour enhancement degree calculation section 16 according to the modified example of the second exemplary embodiment of the invention.

The lightness contour enhancement degree calculation section 16 calculates the enhancement degree for the lightness contour, which will be used in the enhancement process performed by the lightness contour enhancement section 15, based on the vector component information calculated by the vector component information calculation section 33 of the color contour enhancement degree calculation section 12. FIG. 11 is an explanatory view of an example of the operation of the lightness contour enhancement degree calculation section 16 according to the modified example of the second exemplary embodiment of the invention. This example shows the case where the enhancement degree for the lightness contour is determined in accordance with the length of the color component of the difference vector and the length of the lightness component of the difference vector. For example, if it is judged that the color contour intensity is high because the length of the color component of the difference vector is long, the enhancement degree is lowered. This is because the color contour enhancement section 13 performs the enhancement process for the color contour. If it is judged that the color contour intensity is low because the length of the color component of the difference vector is short, the enhancement degree is increased when the length of the lightness component of the difference vector is short, while the enhancement degree is lowered when the length of the lightness component is long. Increasing the enhancement degree when the length of the lightness component of the difference vector is short enhances and clarifies faded characters and fated line drawings, for example, due to a low writing pressure.

In the modified example of the second exemplary embodiment as well, the lightness contour enhancement section 15 performs the enhancement process for the lightness component of the color image in accordance with the enhancement degree for the lightness contour calculated by the lightness contour enhancement degree calculation section 16. Any enhancement method may be used. Examples of the enhancement method include performing the convolution operation for the pixel of interest and the surrounding pixels and using a middle and high frequency enhancement filter.

In the example shown in FIG. 10, the lightness contour enhancement section 15 first performs the enhancement process for the lightness contour (the lightness component) of the color image, and then the color contour enhancement section 13 performs the enhancement process for the color contour. However, the color contour enhancement section 13 may first perform the enhancement process for the color contour, and then the lightness contour enhancement section 15 may perform the enhancement process for the lightness contour.

Figure 12:
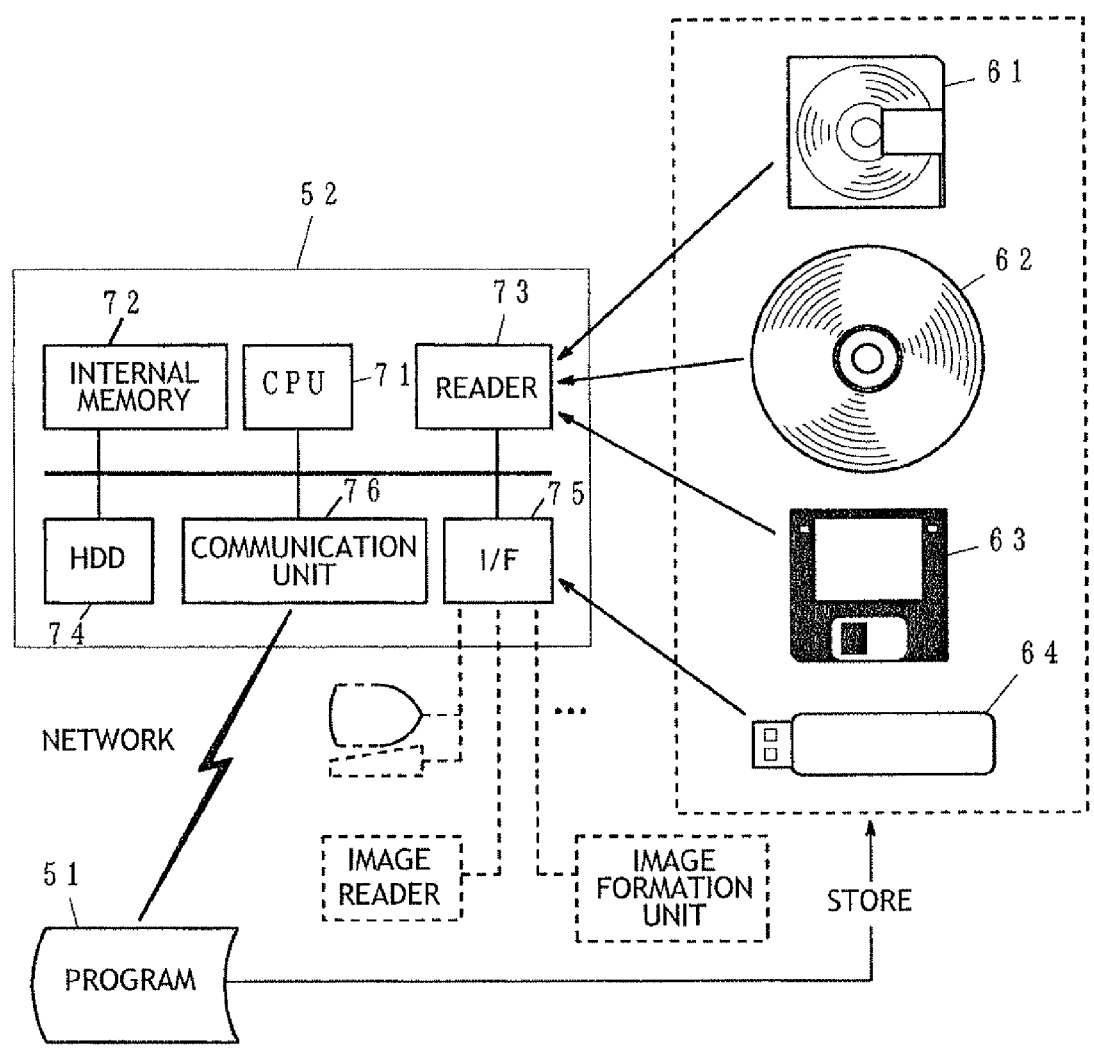
FIG. 12 is an explanatory view of an example of a computer program, a recording medium that stores the computer program, and a computer when functions of the exemplary embodiments of the invention and the modifications thereof are implemented by the computer program.

FIG. 12 is an explanatory view of an example of a computer program, a recording medium that stores the computer program, and a computer in a case where the functions of the above exemplary embodiments of the invention and the modification examples thereof are implemented by the computer program. In FIG. 12, reference numeral 51 denotes a program. Reference numeral 52 denotes a computer. Reference numeral 61 denotes a magneto-optical disk. Reference numeral 62 denotes an optical disk. Reference numeral 63 denotes a magnetic disk. Reference numeral 64 denotes a memory. Reference numeral 71 denotes a CPU. Reference numeral 72 denotes an internal memory. Reference numeral 73 denotes a reader Reference numeral 74 denotes a hard disk drive. Reference numeral 75 denotes an interface. Reference numeral 76 denotes a communication unit.

Part or all of the functions of the sections described in the above embodiments of the invention and the variations thereof may be implemented by the computer-executable program 51. In this case, the program 51, data used in the program, and the like may be stored in a computer-readable recording medium. The recording medium herein causes magnetic, optical, or electric energy, or energy in any other forms to change in accordance with the contents of the program and causes the reader 73 provided as one of the computer hardware resources to transmit the contents of the program in the form of a signal corresponding to the change in energy. Examples of the recording medium include the magneto-optical disk 61, the optical disk 62 (including a CD and a DVD), the magnetic disk 63, the memory 64 (including an IC card and a memory card). These recording media are, of course, not limited to portable ones.

The program 51 is stored in any of these recording media, and the program 51 is read from the computer by loading the recording medium in the reader 73 or the interface 75 in the computer 52. The program 51 is then stored in the internal memory 72 or the hard disk drive 74 and executed by the CPU 71 to implement the functions described in the embodiments and the variations thereof. Alternatively, the program 51 may be transferred to the computer 52 via a network or the like, and the computer 52 receives the program 51 at the communication unit 76 and stores the program 51 in the internal memory 72 or the hard disk drive 74. The CPU 71 then executes the program 51 to implement the functions described in the embodiments and the variations thereof. The computer 52 may further be connected to a variety of devices via the interface 75. For example, the computer 52 may be configured to form a grayscale image by connecting the computer 52 to an image formation unit that forms an output grayscale image. Further, the computer 52 may be connected to, for example, an image reader and process a color image read by the image reader. Moreover, the computer 52 may be connected to, for example, a display device that displays information and an input device through which a user inputs information.

Part or all of the functions may, of course, be implemented by hardware. Alternatively, a program including the invention along with other configurations may be formed. For example, in an apparatus including an image formation apparatus and even an image reader, such as a printer and a copier, a single program along including a control program may be formed. In other applications, a program used in the application of interest can be, of course, integrated.

What is claimed is:

1. An image processing system comprising:
   a processor; and
   a memory;
   the processor configured to carry out instructions comprising:
   a first calculating that calculates a contour intensity of a color component of an input color image and calculates an enhancement degree for a color contour, based on the contour intensity of the color component; and
   a color contour enhancing that performs an enhance process for a lightness component of the color image in accordance with the enhancement degree for the color contour calculated by the first calculating, wherein
   the first calculating calculates a contour intensity of the lightness component of the color image, and calculates the enhancement degree for the color contour based on the contour intensity of the color component and the contour intensity of the lightness component,
   the instructions further comprising;
   a second calculating that calculates an enhancement degree for a lightness contour based on the contour intensity of the color component and the contour intensity of the lightness component calculated by the first calculating; and
   an enhancing that performs an enhance process for the lightness component of the color image in accordance with the enhancement degree for the lightness contour calculated by the second calculating.

2. An image processing system comprising:
   a processor; and
   a memory;
   the processor configured to carry out instructions comprising:
   a first calculating that calculates a contour intensity of a color component of an input color image and calculates an enhancement degree for a color contour, based on the contour intensity of the color component; and
   a color contour enhancing that performs an enhance process for a lightness component of the color image in accordance with the enhancement degree for the color contour calculated by the first calculating, wherein
   the first calculating calculates the enhancement degree for the color contour in a pixel of interest, based on a difference vector between a color value of the pixel of interest and an average color value of a surrounding area of the pixel of interest,
   the instructions further comprising;
   a second calculating that calculates an enhancement degree for a lightness contour based on the difference vector; and
   an enhancing that performs an enhance process for lightness component of the color image in accordance with the enhancement degree for the lightness contour calculated by the second calculating.

3. A non-transitory computer-readable medium storing a program that causes a computer to execute image processing apparatus, the image processing comprising:
   a first calculating that calculates a contour intensity of color component of an input color image, and calculates an enhancement degree for a color contour, based on the contour intensity of the color component; and
   an enhancing that performs an enhance process for lightness component of the color image in accordance with the calculated enhancement degree for the color contour, wherein
   the first calculating includes calculating the enhancement degree for the color contour in a pixel of interest, based on a difference vector between a color value of the pixel of interest and an average color value of a surrounding area of the pixel of interest,
   the instructions further comprising;
   a second calculating that calculates an enhancement degree for a lightness contour based on the difference vector; and
   an enhancing that performs an enhance process for lightness component of the color image in accordance with the enhancement degree for the lightness contour calculated by the second calculating.

* * * * *